United States Patent Office 2,942,575
Patented June 28, 1960

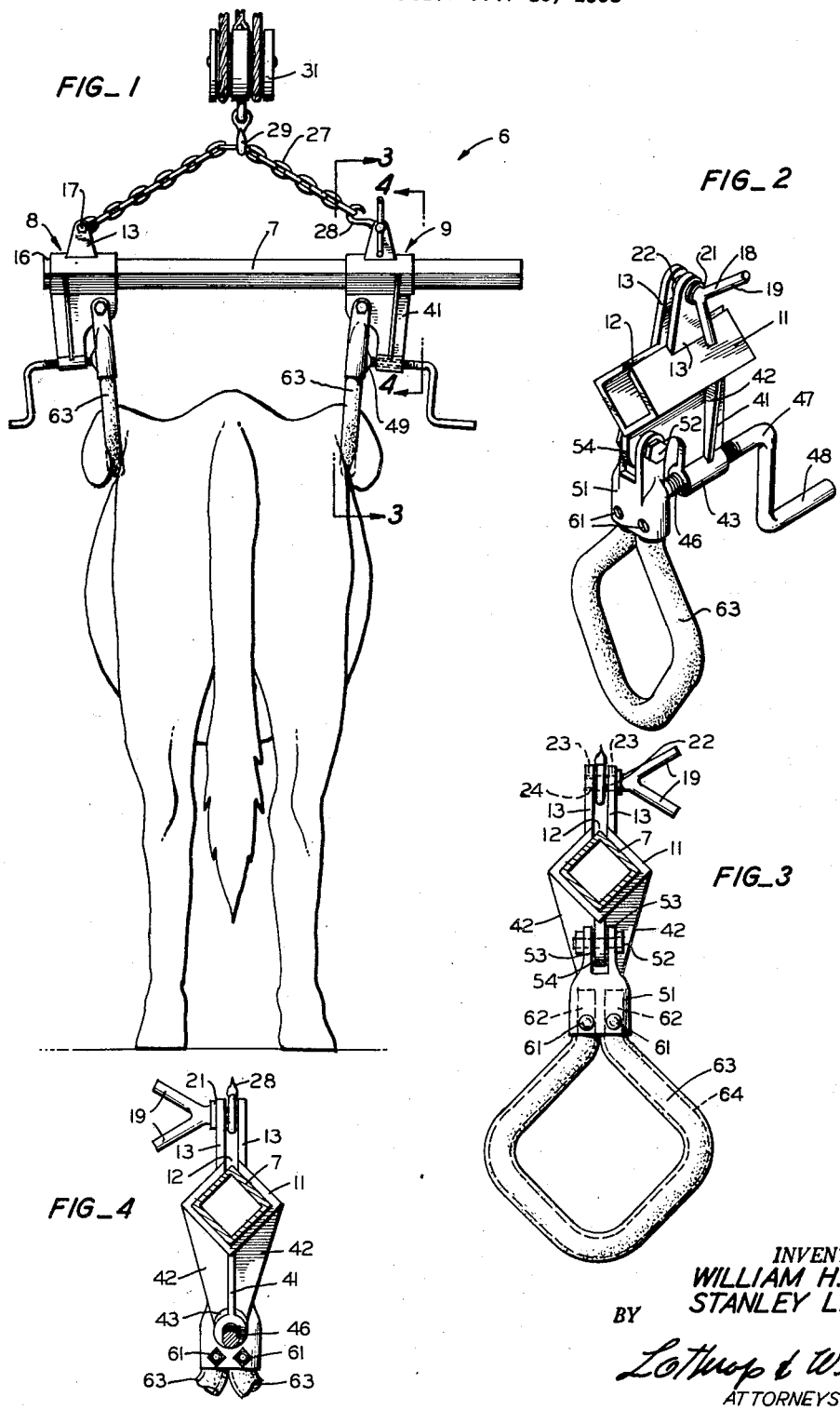
June 28, 1960    W. H. BOYD ET AL    2,942,575
CATTLE HOIST
Filed Oct. 13, 1958
INVENTORS
WILLIAM H. BOYD
STANLEY L. BOYD
BY
*Lothrop & West*
ATTORNEYS

2,942,575

CATTLE HOIST

William H. Boyd, 5409 8th Ave., and Stanley L. Boyd, 3521 55th St., both of Sacramento, Calif.

Filed Oct. 13, 1958, Ser. No. 766,909

2 Claims. (Cl. 119—100)

The invention relates generally to devices for lifting large animals to their feet, and, more particularly, it relates to an improvement in the device of the invention shown in Patent No. 2,743,701, dated May 1, 1956.

Cows which are afflicted with paralysis after calving or which are "down" for some other reason, such as a fracture of the posterior extremities, are known as "downers" or "downer cows." In times past, tail lifting has sometimes been resorted to in order to lift a downer to its feet, a procedure which is most unsatisfactory owing to the likelihood of fracture of the sacrum. At other times, a belly sling has been tried, this also having been found to be unacceptable.

It is therefore an object of the instant invention to provide a lifter-sling which enables a downer cow to be lifted and supported in a safe manner for as long a period as is called for under the circumstances.

It is another object of the invention to provide a device which, in addition to being "valuable for complicated milk fever cases and for cows paralyzed after calving, the lifter sling also facilitates the diagnosis of fractures of posterior extremities and holds the cow in standing position to aid in rumenotomies, vaginal surgery, prolapsed uterus, dystocias, etc." (Article, "New Cattle Sling for Downer Cows," Norden News, a Veterinary Digest, vol. 33, No. 2, August 1958, page 15.)

It is still another object of the invention to provide a cattle sling which is sturdy and which is quickly and easily adjusted and maneuvered.

It is yet another object of the device to provide a generally improved cattle lifter.

Other objects, together with the foregoing, are attained in the embodiment described in the following description and shown in the accompanying drawings in which:

Figure 1 is a rear elevation of the device in a typical environment, the loops gripping the tuber coxae of a cow;

Figure 2 is a perspective to an enlarged scale of one of the gripping mechanisms;

Figure 3 is a section to an enlarged scale, the plane of section being indicated by the line 3—3 in Figure 1; and Figure 4 is a section to an enlarged scale, the plane of section being indicated by the line 4—4 in Figure 1, a portion of the figure being broken away to reduce the extent thereof.

While the lifter sling of the invention is susceptible of numerous physical embodiments, depending on the environment and requirements of use, substantial numbers of the herein shown and described embodiment have been made, used and sold throughout the United States, and have been demonstrated and tested before numerous groups, and all have performed in an eminently successful fashion.

The device of the invention, generally designated by the numeral 6, comprises an elongated cross-bar 7, preferably square in cross-section, the bar 7 serving to support and maintain in accurate alignment and registry a first gripping mechanism, or bracket, generally designated by the numeral 8, and a second gripping mechanism, or bracket, generally designated by the numeral 9.

Each of the gripping mechanisms is substantially identical to the other, with the exceptions hereinafter pointed out, and a description of one will therefore serve to describe the other.

A hollow sleeve 11, square in section, is provided with a slot 12 extending from end to end on the uppermost corner of the square, the slot enabling the sleeve to be clamped securely to the cross bar 7 at any predetermined location by urging together a pair of ears 13 mounted on the sleeve on opposite sides of the slot.

Conveniently, the first gripping mechanism 8 is permanently located adjacent one end 16 of the cross-bar. Consequently, the ears 13 on the first gripping structure 8 are urged toward each other in bar clamping fashion by a conventional bolt 17 and nut, or comparable fastenings.

The second gripping mechanism 9, however, is provided with a convenient and readily lockable and unlockable arrangement including a Y-bolt 18 having a pair of arms 19, a fixed shoulder 21, and a shank 22 extending through registering openings 23 in the ears 13, the opening 23 remote from the Y-arms being tapped to engage with threads 24 on the distal end of the shank 22.

Upon loosening the Y-bolt, the natural resiliency of the hollow sleeve 11 opens the slot 12 and enables the second gripping mechanism to be translated to any location on the bar deemed most suitable to the size and condition of the animal to be lifted. The proper location having been determined, the structure is quickly clamped to the bar by suitably rotating the Y-arms 19.

A chain 27, wire rope, or other comparable member, extends from the bolt 17 to a hook 28 encompassing the shank 22 of the Y-bolt. The chain is provided with some slack, and a number of extra links (not shown) so that the hook 29 of a suitable hoisting device 31 can be attached thereto at a location approximately mid-way between the gripping brackets 8 and 9.

Mounted on and depending from the bottom corner of the sleeve 11 is a mounting plate 41, additional strength and stiffness being provided by a pair of laterally extending, triangular-shaped gussets 42, the bottom of the plate 41 and the gussets 42 having mounted thereon an interiorly threaded collar 43.

The axis of the threaded collar 43 is disposed at a slight angle with respect to the longitudinal axis of the cross-bar, the collar axis inclining upwardly and inwardly.

In threaded engagement with the collar 43 is the threaded stem 46 of a crank 47 having a handle 48 enabling the user to turn the crank and thereby move inwardly and outwardly a shoe 49 mounted on the inner end of the stem 46.

The crank shoe 49 bears, in turn, against the outer face of a housing 51 pivotally mounted on a bolt fastening 52 passing through a pair of ears 53, upstanding from the housing, and through an inward extension 54, or flange, of the mounting plate 41.

Secured within the housing 51, as by fastenings 61 are the bases 62 of a loop 63 adapted to engage with or grip the tuber coxae of a cow, as appears most clearly in Figure 1. It is to be noted that the loop 63 is covered with a resilient coating 64, or tubing, preferably of a material such as gum rubber, secured to the loop over substantially all of the loop's length.

As can be seen in Figure 1, the loops 63 are inclined inwardly at a small angle with respect to the vertical, this angle being substantially normal to the angle of inclination of the axis of the crank stem. It has been found that this angularity, ranging between five to approximately fifteen degrees not only gives an optimum value with respect to engagement with the tuber coxae but it also enhances the stability of the lifting effort. The angularity of the crank stem provides the user with a visual indication of the proper loop attitude, the crank being turned until the loop is substantially at right angles to the axis of the crank stem.

It can therefore be seen that we have provided a light yet durable device for lifting the posterior of a downer cow and a device which can readily be adjusted to meet the circumstances and requirements of use.

What is claimed is:

1. A cattle sling for downer cows comprising an elongated cross-bar, a pair of brackets slidably disposed on said cross-bar, means for clamping said brackets at predetermined locations on said cross-bar whereby said brackets can be spaced apart at selected distances, a hoisting chain detachably mounted on each of said brackets whereby a hoisting effort on the middle of said chain is transmitted substantially equally to each of said brackets, a pair of loops adapted to encompass the tuber coxae of a downer cow, said loops being pivotally mounted on said brackets to pivot toward and away from each other about axes perpendicular to the axis of said cross-bar, said loops being mounted substantially vertically below the location of attachment of said chain and depending from said brackets whereby the hoisting effort transmitted by said chain to said brackets is transferred substantially vertically downwardly to said loops, and means for pivoting said loops to selected angular inclinations with respect to said cross-bar.

2. The device of claim 1 wherein said loop-pivoting means comprises a crank in threaded engagement with a threaded collar mounted on said bracket, the axis of said collar intersecting said loop adjacent its pivot axis and being inclined inwardly and upwardly toward the axis of said cross-bar at an angle of approximately five to fifteen degrees.

References Cited in the file of this patent

UNITED STATES PATENTS 2,743,701     Boyd ------------------ May 1, 1956